United States Patent [19]

Jackson et al.

[11] Patent Number: 4,562,944
[45] Date of Patent: Jan. 7, 1986

[54] ADJUSTABLE CONNECTIONS ON CYCLE REAR CARRIER

[75] Inventors: W. Shaun Jackson, Ann Arbor; Leslie E. Bohm, Southfield, both of Mich.

[73] Assignee: Eclipse, Inc., Ann Arbor, Mich.

[21] Appl. No.: 527,763

[22] Filed: May 8, 1981

Related U.S. Application Data

[60] Continuation of Ser. No. 8,801, Feb. 1, 1979, Pat. No. 4,266,702, which is a division of Ser. No. 768,467, Feb. 14, 1977, Pat. No. 4,174,795.

[51] Int. Cl.$^4$ ................................................ B62J 7/04
[52] U.S. Cl. .................................... 224/39; 224/32 A
[58] Field of Search ............... 224/30 R, 30 A, 32 R, 224/32 A, 35, 36, 40, 42, 39, 42.42 R, 42.45 R, 42.46 R; 248/223.4, 224.3, 226.5; 280/202, 289 A

[56] References Cited

U.S. PATENT DOCUMENTS

| | | |
|---|---|---|
| 460,332 | 9/1891 | Coates . |
| 1,030,844 | 6/1912 | Howell . |
| 1,260,937 | 3/1918 | Muller, Jr. . |
| 1,547,671 | 7/1925 | Mathews .................. 224/39 R |
| 2,527,433 | 10/1950 | Rochelle .................. 224/32 R |
| 2,721,718 | 10/1955 | Wagner ...................... 248/214 |
| 2,908,434 | 10/1959 | Schnabel .............. 224/42.42 R |
| 3,572,758 | 3/1971 | Lee ............................ 280/296 |
| 3,795,354 | 3/1974 | Stippich ....................... 224/32 |
| 3,850,353 | 11/1974 | Foulds .................. 224/30 R X |
| 3,921,868 | 11/1975 | Reichbach ................... 224/32 |
| 3,934,770 | 1/1976 | Larsen ........................ 224/33 |
| 3,955,727 | 5/1976 | Montgomery .......... 224/32 A X |
| 3,963,158 | 6/1976 | Clenet ........................ 224/31 |
| 3,970,229 | 7/1976 | Norinsky ..................... 224/31 |
| 4,053,091 | 10/1977 | Martelet ...................... 224/32 |
| 4,154,382 | 5/1979 | Blackburn .................... 224/39 |
| 4,174,795 | 11/1979 | Jackson et al. ............ 224/32 A |
| 4,266,702 | 5/1981 | Jackson et al. .............. 224/31 |

FOREIGN PATENT DOCUMENTS

| | | |
|---|---|---|
| 110934 | 10/1928 | Austria ........................... 224/39 R |
| 487902 | 11/1952 | Canada . |
| 553350 | 6/1932 | Fed. Rep. of Germany . |
| 572417 | 3/1933 | Fed. Rep. of Germany . |
| 599075 | 6/1934 | Fed. Rep. of Germany . |
| 638917 | 11/1936 | Fed. Rep. of Germany . |
| 1014872 | 8/1957 | Fed. Rep. of Germany ... 224/42.46 R |
| 337599 | 9/1903 | France ........................... 224/39 R |
| 563581 | 9/1923 | France ........................... 224/30 R |
| 1352644 | 1/1964 | France . |
| 1534010 | 6/1968 | France ........................... 224/39 R |
| 87303 | 8/1957 | Netherlands ................... 224/39 R |
| 168511 | 9/1959 | Sweden . |
| 21705 | 8/1912 | United Kingdom ............ 224/39 R |

Primary Examiner—William Price
Assistant Examiner—Gary E. Elkins
Attorney, Agent, or Firm—Krass & Young

[57] ABSTRACT

A pannier mounting arrangement is disclosed for mounting panniers on the rear carrier rack of cycle vehicles such as bicycles or motorcycles including an elongated rod permanently attached to each pannier encased within a pouch extending across the upper edge of the pannier, the rod adapted to be slidably received within a channel section, either formed in a track section attached to existing bicycle carrier racks or formed integrally in a horizontal platform of specially designed carrier racks incorporating the mounting arrangement components. Also disclosed is a specially designed rear carrier rack which includes a horizontal platform having the channel sections integrally formed therein supported by a plurality of struts arranged to provide a rigid support. The rear carrier rack also features an arrangement for providing an adjustment in the length of the horizontal platform, so as to be readily installed on cycle vehicles of various frame sizes and configurations.

3 Claims, 8 Drawing Figures

U.S. Patent   Jan. 7, 1986   Sheet 1 of 2   4,562,944
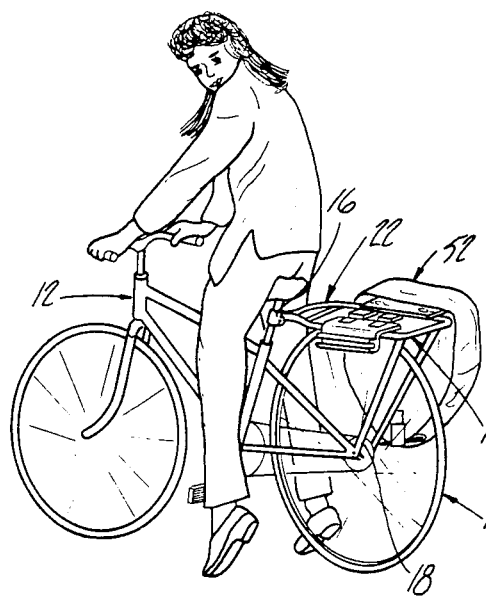
Fig-1
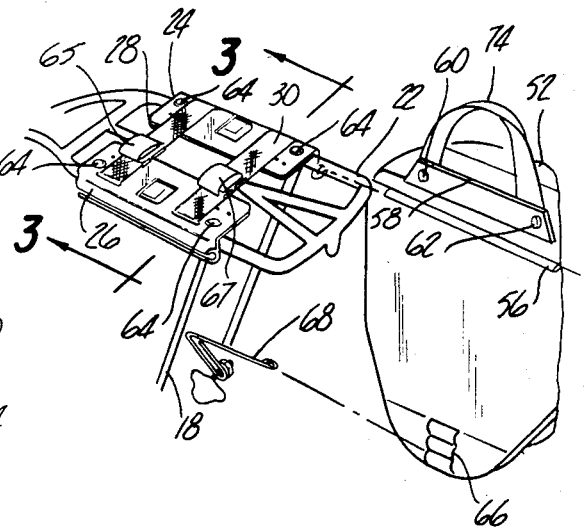
Fig-2
Fig-3
Fig-4
Fig-5

ADJUSTABLE CONNECTIONS ON CYCLE REAR CARRIER

This application is a continuation application of U.S. Ser. No. 8,801, filed Feb. 1, 1979, now U.S. Pat. No. 4,266,702 which is a divisional application of U.S. Ser. No. 768,467, filed Feb. 14, 1977, now U.S. Pat. No. 4,174,795.

BACKGROUND OF THE INVENTION

1. Field of the Invention

This invention concerns mounting arrangements for panniers which are adapted to be mounted to cycle vehicles disposed on one or both sides of the cycle rear wheel. Such mounting arrangements typically comprise a securement of the pannier to the rear wheel carrier rack often provided on cycle vehicles such as bicycles and motor cycles.

2. Brief Description of the Prior Art

Attachment of such panniers to cycle carrier racks typically includes loops, springs, snaps, etc. which provide for encirclement of structural members of the rear carrier rack. Difficulties encountered with this approach include the vulnerability of the attachment hardware, which have a tendency to fail when loaded heavily, to fall off, or to get lost. The strength of such an attachment method is also compromised by the point concentration of the load creating a tendency for the bag to tear or the straps or hardware, etc. to fail. Many of such systems are also relatively cumbersome in carrying out installation of the pannier which is a substantial disadvantage, since the pannier may be utilized as a detachable backpack with frequent removal and installation thereof in the course of a tour. Another drawback is encountered in those systems in which the pannier is supported by means of loops encircling structural members of the carrier rack in that this would allow a certain amount of fore and aft shifting and mispositioning of the pannier.

While any such mounting system should be preferably very strong and capable of supporting a heavily loaded pannier, weight considerations preclude the use of heavy mounting components. While panniers are often mounted in pairs on either side of the cycle rear wheel, it is very desirable that the panniers be capable of being independently installed and removed to provide flexibility in their use.

In addition the carrier rack itself should preferably be very sturdily supported to provide lateral or antisway stability, so as to adequately resist tendencies of the pannier to shift laterally when heavily loaded during turning movements.

Another desirable feature of carrier racks is the ease with which they may be adapted to cycle vehicles of various sizes and configurations in order that numerous models of the carrier rack are not necessitated.

It is therefore an object of the present invention to provide a mounting arrangement for mounting such panniers to carrier racks, which does not involve the use of complicated fasteners or other components and which subject the pannier to concentrated loads.

It is yet another object of the present invention to provide such a mounting arrangement which permits precise and secure fore and aft positioning of the panniers with respect to the carrier rack.

It is yet another object of the present invention to provide such a mounting arrangement in which the pannier may be attached or removed in seconds and in which pannier pairs may be installed and removed independently of one another.

It is still another object of the present invention to provide such a mounting arrangement which is simple and lightweight and while providing a very strong support capable of supporting heavily loaded panniers.

Another object of the present invention is to provide a specially designed carrier rack for incorporating such a mounting arrangement, which is adaptable to widely varying cycle frame sizes and configurations and which provides a stable support for the panniers.

SUMMARY OF THE INVENTION

These and other objects of the present invention which will become apparent upon a reading of the following Specification and Claims is accomplished by a mounting arrangement including an elongated rod encased within a fabric pouch extending along an upper edge of the pannier which rod is adapted to be received within a channel section formed either on track sections secured to an existing carrier rack or integrally formed in a specially configured carrier rack horizontal platform to provide a slide-on mount which distributes the load across the entire upper edge of the pannier. Fasteners secured to an upper flap of the pannier are provided retaining the flap to the track sections or directly to the horizontally platform to secure the position of the pannier fore and aft with respect to the carrier rack. The bottom portion of the pannier is secured with a webbing loop positioned to receive a wire form projection during installation, the wire form to be either bolted to an existing carrier rack support bracketry or formed integrally with a carrier rack support bracket to stabilize the lower portion of the pannier. The mounting arrangement is readily adaptable to other luggage items by the expedient of securing a similar support rod along a longitudinal edge of the luggage item.

The carrier rack incorporating the mounting arrangement includes a load support member comprised of a horizontal platform slidably receiving a pair of rear extension rod members, which allow adjustability in length of the horizontal platform, and by clamping means pivotally mounted to the outer end of each rear extension rod member, the attachment of the horizontal platform to widely varying frame configurations is facilitated. Vertical support for the horizontal platform is provided by bracketry means including a plurality of strut members extending downwardly from the horizontal platform to a point of attachment to the cycle frame, a set of the strut members disposed on either side of the horizontal platform to straddle the cycle rear wheel. Two of the strut members in each set extend from a point along the side of the horizontal platform and converge together to define a pannier support plane, roughly triangular in shape, while a third strut extends from a point on the horizontal platform spaced inwardly from the horizontal platform side to provide a lateral or antisway brace stabilizing the horizontal platform against side-to-side movements. The horizontal platform includes parallel extending upper and lower channel sections formed along either side thereof, with the upper channels receiving the front extension rod members and also a rear platform extension including a pair of rod ends adapted to be received within the upper channel sections opposite the front extension rod members. The lower channel sections on either side are adapted to perform the rod receiving function of the pannier mounting arrangement according to the present invention.

DESCRIPTION OF THE DRAWINGS

FIG. 1 is a perspective view of a bicycle with a pannier mounted to the rear carrier rack of an existing rear carrier rack by the mounting arrangement according to the present invention.

FIG. 2 is an enlarged perspective view of the rear carrier rack, shown on the bicycle in FIG. 1, with the pannier bag positioned ready to be installed thereon.

FIG. 3 is a view of the section 3—3 taken through the carrier rack, shown in FIG. 2.

FIG. 4 is a perspective view of an alternate embodiment of the track sections included in the mounting arrangement shown in FIGS. 1 through 3.

FIG. 5 is an enlarged side elevational view of a portion of the rear carrier rack support bracketry, shown in FIG. 1, showing a wire form retainer installed on the bracketry.

DETAILED DESCRIPTION

Figure 6:
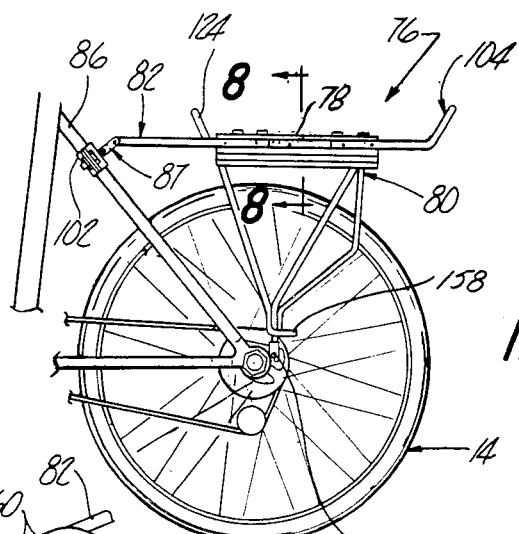
FIG. 6 is a partial view of a bicycle having installed a rear carrier rack especially adapted to the pannier mounting arrangement according to the present invention.

In the following detailed description certain specific terminology will be utilized for the sake of clarity and a specific embodiment described in accordance with the requirements of 35 USC 112, but it is to be understood that the same is not intended to be limiting and should not be so construed, inasmuch as the invention is capable of taking many forms and embodiments within the scope of the appended claims.

Referring to the drawings and particularly FIGS. 1 through 5, a version of the mounting arrangement according to the present invention is disclosed which is adapted to be added to an existing rear carrier rack 10 which is commonly provided on cycle vehicles such as the bicycle 12 shown in FIG. 1, the rear carrier rack 10 extending over the rear wheel 14 of the bicycle. The rear carrier rack 10 is typically secured to the bicycle by clamp 16 encircling the seat mast, as shown, with downwardly extending bracketry 18 being provided, connected to the bicycle frame in the vicinity of the bicycle rear wheel axle 20. The rear carrier rack 10 includes load support means comprised of a horizontal platform, typically formed of a welded tube structure of the type shown in FIGS. 1 and 2.

The pannier mounting arrangement according to the present invention includes a pair of track sections 24 and 26 mounted on either side of the carrier rack 10 by being strapped with straps 28 and 30 to the carrier rack horizontal platform 22. The straps 28 and 30 are looped through slots 32 and 34, and 36 and 38 respectively, provided in the track sections 24 and 26 and passed around tubing members 40 and 42, which comprise a portion of the horizontal platform 22, to thus securely retain the track sections 24 and 26. Velcro patches or other suitable retainers (not shown) are provided to secure the straps 28 and 30.

Each track section 24 and 26 includes a channel section 44 and 46 respectively, extending alongside the horizontal platform 22 when the track section 24 and 26 are installed thereon. Each channel section 44 and 46 includes a channel opening 48 and 50.

The luggage item to be mounted, shown as a pannier bag 52 in FIGS. 1 and 2, has secured in an upper portion thereof an elongated rod element 54 which is encased within a pouch 56 formed of the fabric of the pannier 52 to thereby secure the rod element 54 to the pannier 52. The channel section openings 48 and 50 are configured to slidably receive and partially encircle the rod elements 54 and surrounding fabric material forming the pouch 56, so as to allow the pannier 52 to be supported across an upper edge by the respective track section 24 or 26.

The pannier 52 also has provided a flap 58 secured above the pouch 56, which is provided with a pair of snap fasteners 60 and 62 located on the underside thereof, and which are adapted to mate with corresponding snaps 64 provided on each track section 24 and 26. This provides a retainer means for positioning of the pannier bag 52 fore and aft within the respective channel sections 48 or 50, so as to provide precise and secure positioning thereof as preventing shifting of the pannier 52 under the influence of accelerations and decelerations of the bicycle.

Secondary retainer means are also provided to be slidably received within retention means on the lower end of the pannier 52 comprised of webbing loops 66 provided on the inside of the pannier 52, adapted to slidably receive a wire form 68 which is mounted to the lower end of the carrier rack bracketry 18 by means of a bolt 70, as shown in FIG. 4. The wire form 68 including a rearwardly extending projection portion 72 which is positioned so as to be simultaneously received within the webbing loop 66 at the same time that the rod element 54 is being slid into the channel sections 48 or 50 to thus provide a secure positioning of the pannier 52 against bouncing forces normally imposed by road bumps, etc.

It can be appreciated that this arrangement accomplishes the aims of the present invention inasmuch as the hardware involved is minimal and is securely retained in the system so that the elements thereof are not apt to get lost. The snap fasteners 60, 62 and 64 do not bear the weight of the pannier 52, and thus will seldom fail or become detached.

The support for the weight of pannier 52 and its contents is along the entire length of the rod element 54 so as to very adequately distribute the load and reduce the strain imposed on the components to a relatively low level, even when the pannier 52 is heavily loaded.

The installation and detachment of the pannier 52 is very quick, involving only single slidable positioning movement from the position shown in FIG. 2 forwardly to slide the rod element 54 within the channel section, with simultaneous sliding of the wire form 68 into the lower webbing loop 66. It would thus require only a matter of a few seconds to install the pannier 52 with a subsequent fastening of the fasteners 60, 62 and 64 which, since no stretching of the material is involved, can be carried out in a moment. In addition it can also be seen that the pannier 52 is accurately positioned fore and aft, since these latter fasteners very effectively locate the pannier 52, and the secondary retainer means resist any dislodging forces.

The snaps 64 provided on the track sections 24 and 26 may be alternately figured, i.e. male to female, so the track sections may be conveniently snapped together and stowed with the straps 28 and 30 when not in use.

Track sections 24 and 26 themselves may appropriately be fabricated from aluminum extrusions, light in weight and low in cost, whereas the straps 28 and 30 could advantageously be of light weight nylon webbing. The flaps 58 formed on the pannier 52 may form an anchor structure for the carrying loop 74.

The rod element 54 would preferably be constructed of lightweight Fiberglas to further contribute to the extremely lightweight design of the mounting arrangement.

Referring to FIG. 4, an alternate embodiment of the track sections 24 and 26 is shown, in which an additional channel opening 73 is provided extended along but above the pannier mounting channel opening 50, as shown. This would provide for installation of front or rear extension rods 75, or both to provide an elevated cross rod 77 acting as a load retention means for items mounted to the horizontal platform 22.

Figure 8:
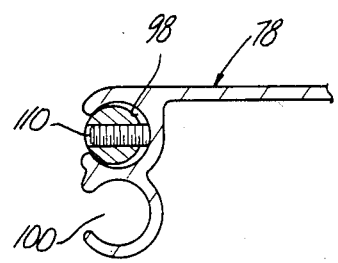
FIG. 8 is a sectional view of the section 8—8 taken in FIG. 6.
Figure 7:
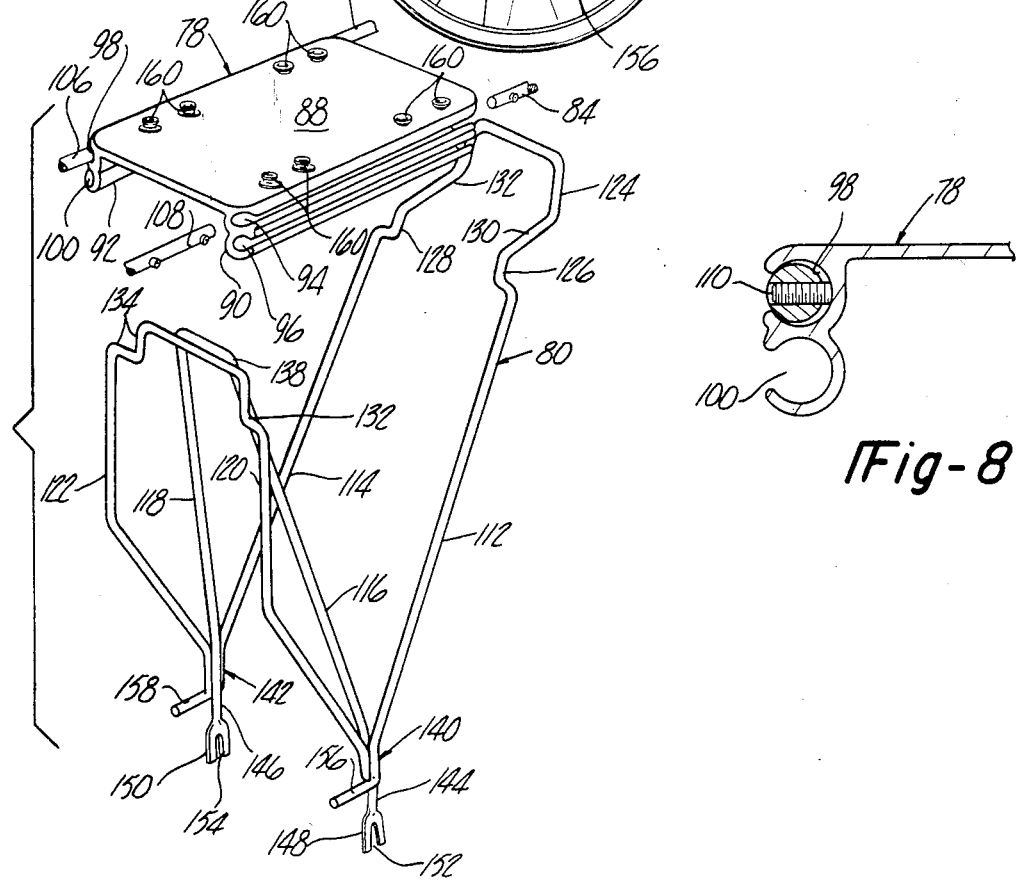
FIG. 7 is an exploded perspective view of the carrier rack structure shown in FIG. 5.

Referring to FIGS. 6 through 8, a carrier rack 76 is depicted which integrally incorporates the mounting arrangement according to the present invention and which in addition is adaptable to bicycle frame structures of widely varying configurations and sizes, and which features extremely stable supporting bracketry which resist the lateral loads imposed by a heavily loaded pannier. The carrier rack 76 includes a horizontally extending load support member comprised of a horizontally extending platform 78 which is positioned over the rear cycle wheel 14 by bracket means 80 providing vertical support for the horizontal platform 78 and a pair of front extension rods 82 and 84 secured to the bicycle frame structure 86 acting in cooperation with the bracket means 80 to provide secure positioning of the horizontal platform 78 on the bicycle frame.

The horizontal platform 78 may be formed by an aluminum extrusion having an upper planar surface 88 and downwardly extending side portions 90 and 92, each of which are formed with channels 94, 96 and 98 and 100, respectively. The upper channels 94 and 98 receive at the front end thereof a pair of front extension rods 82 and 84 which are slidable therein so as to provide a length adjustment of the horizontal platform 78 and to allow extension thereof to be positioned with respect to the bicycle frame member 86. Each of the front extension rods 82 and 84 have pivotally mounted thereto clamping attachments 102 such as is shown with respect to extension rod 82. The clamping attachments 102 are pinned to the outer end of the front extension rod 82 by a clevis 87 so as to allow pivotal adjustment of the clamping means to properly be positioned with respect to the framing member 86 through a range of bicycle frame configurations.

At the other end of the channels 94 and 98 a rear extension bracket 104 is provided having ends 106 and 108 slidably received within the respective channels 98 and 94 and adjustable therein. Both the front extension members 82 and the end portions 106 and 108 are secured in any adjusted position by means of set screws 110, as shown in FIG. 8, passing transversely through the respective rods and into engagement with the interior wall of the channel section.

The bracket means 80 is comprised of a plurality of downwardly extending struts 112, 114, 116, 118, 120 and 122. Struts 112, 116 and 120 form one strut set, and struts 114, 118 and 122 form another strut set, each strut set disposed on either side of the rear bicycle wheel 14, straddling the same.

Struts 112 and 114 are joined at their upper ends by an upwardly projecting U-portion 124 which also will act as a frontal load retention projection. Each of the downwardly extending struts 112 and 114 have offset sections 126 and 128 which locate horizontally extending sections 130 and 132 so as to fit within the underside of the horizontal platform member 78 and are fixedly secured to the underside thereof by welding or other suitable means. Struts 120 and 122 have similar offset sections 134 and 136 which position a transverse section 138 to similarly fit within the horizontal platform member 78 and be secured to the undersurface thereof by welding or other suitable means. The downwardly extending strut sets 112, 116, 120 and 114, 118, 122 converge at their lower ends and are welded together at 140 and 142. Strut members 116 and 118 have a downwardly extending projection portion 144 and 146 each having a swaged end portion 148 and 150, respectively, with a slot 152 and 154 formed therein, adapted to receive bolts 156 secured to the cycle frame structure to thereby secure the bracket means 80 to the bicycle frame.

Strut pairs 112 and 120 and 114 and 122, respectively, provide roughly triangular pannier support planes by being positioned on either side of the horizontal platform 78 to engage and provide lateral support for the interior sides of the pannier 52. The strut members 116 and 118 extend downwardly from the horizontal platform 78 from a position inward of the side portions 90 and 92 of the horizontal platform 78 by virtue of being welded to the transverse section 138 of the strut members 120 and 122, as shown in FIG. 7, to form a stabilizer triangle with respect to the plane of the aforementioned strut pairs. The struts 116 and 118 thus resist any tendency for the assemblage to sway under the influence of turning movements of the bicycle when the panniers 52 are heavily loaded.

Rearwardly extending projections 156 and 158 are provided to perform the function of wire form element 68 provided in the above-described add-on embodiment, and are simultaneously received within webbing loops 66 formed on the pannier bag at the same time the rod element 54 is being received within the channel sections 96 or 100. Snap fasteners 160 are provided on the upper surface 88 of the horizontal platform member 78 with offset paired locations thereof to allow some adjustment in the position of the panniers 52 with respect to the carrier rack structure 76.

The front extension rods 82 and 84 allow the carrier rack structure 76 to be adapted to bicycle or motorcycle frames of various sizes and configurations without any necessity of redesign of the carrier rack geometry, since the horizontal platform 78 can be positioned in a horizontal attitude with varying locations of the frame member 86. This is done at installation by first mounting the clevised ends 148 and 150 to the bicycle frame, and by extending the front extension rods 82 and 84 forwardly and pivoting the clamping attachments 102 to allow proper securement to the bicycle frame members 86.

The resulting structure is extremely rigid and resists loads in all directions imposed by the panniers 52, even when the panniers 52 are heavily loaded by the provision of the bracing struts 116 and 118 resisting such swaying movements. This considerable rigidity has been achieved without the use of massive framing members or other components to provide a lightweight carrier rack.

The embodiments of the invention in which an exclusive property or privilege is claimed are defined as follows:

1. A carrier rack for a cycle vehicle, comprising:
    a substantially horizontally extending load support adapted to extend over the rear wheel of said cycle;
    bracket means extending downwardly from said load support for supporting said load support on said cycle;
    a pair of laterally spaced extension members projecting forwardly from said load support;
    means for attaching the forward ends of said extension members to said cycle;
    a pair of laterally spaced channel means on said load support for respectively slideably receiving the rear ends of said extension members therein; and
    means for releasably securing said channel means and said extension members against sliding movement relative to each other;
    said pair of channel means each including a forwardly extending track portion within which a channel is defined;
    each of said track portions including a lateral opening communicating with the respective channel and extending along a substantial length of the channel; and
    said securing means being connected to said rear ends of said extension members and being disposed in registration with the corresponding openings in said track portions.

2. The carrier rack of claim 1, wherein said rear ends of said extension members each include a threaded aperture therein and said securing means includes a threaded male member threadably received within said aperture.

3. The carrier rack of claim 2, wherein the rear end of each of said extension members includes two of said apertures and said securing means includes a pair of said male members.

* * * * *